United States Patent
Czapla et al.

(10) Patent No.: US 12,535,032 B2
(45) Date of Patent: Jan. 27, 2026

(54) AIRCRAFT NACELLE COMPRISING A SEALED BOX STRUCTURE AND A DOOR WHICH OPENS THE BOX STRUCTURE TO THE OUTSIDE

(71) Applicant: Airbus Operations SAS, Toulouse (FR)

(72) Inventors: Lionel Czapla, Toulouse (FR); Christophe Labarthe, Toulouse (FR); Kotaro Fukasaku, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/774,119

(22) Filed: Jul. 16, 2024

(65) Prior Publication Data
US 2025/0026481 A1    Jan. 23, 2025

(30) Foreign Application Priority Data
Jul. 18, 2023   (FR) ........................................ 2307702

(51) Int. Cl.
*F02C 3/22*   (2006.01)
*F02C 7/25*   (2006.01)

(52) U.S. Cl.
CPC ................. F02C 3/22 (2013.01); F02C 7/25 (2013.01); *F05D 2260/602* (2013.01); *F05D 2260/605* (2013.01); *F05D 2260/608* (2013.01)

(58) Field of Classification Search
CPC ........ F02C 7/25; F02C 3/22; F05D 2260/605; F05D 2260/602; F05D 2260/608
See application file for complete search history.

(56) References Cited

U.S. PATENT DOCUMENTS

| | | | | |
|---|---|---|---|---|
| 4,825,644 A | * | 5/1989 | Bubello | B64D 29/00 60/39.83 |
| 5,623,820 A | * | 4/1997 | Balzer | B64D 29/02 60/39.83 |
| 10,801,363 B2 | * | 10/2020 | Hussain | F02C 7/00 |
| 2004/0238687 A1 | * | 12/2004 | Jones | F02K 1/64 244/62 |
| 2011/0297787 A1 | * | 12/2011 | Guillaume | B64D 29/06 49/31 |
| 2022/0396367 A1 | | 12/2022 | Smith | |
| 2023/0043843 A1 | | 2/2023 | Pissavin et al. | |

FOREIGN PATENT DOCUMENTS

GB    2403774 A    1/2005

* cited by examiner

*Primary Examiner* — Ted Kim
(74) *Attorney, Agent, or Firm* — Greer, Burns & Crain, Ltd.

(57) ABSTRACT

A nacelle comprising a cowl which has a window, a box structure around the window and containing a conditioning device for conditioning dihydrogen, a door mounted pivotably on the cowl between a closed position and an open position, a maneuvering system for moving the door from the closed position to the open position, a detector for detecting the presence of dihydrogen in the box structure, and a control unit designed to make the maneuvering system open on the basis of information supplied by the detector.

9 Claims, 5 Drawing Sheets

AIRCRAFT NACELLE COMPRISING A SEALED BOX STRUCTURE AND A DOOR WHICH OPENS THE BOX STRUCTURE TO THE OUTSIDE

CROSS-REFERENCES TO RELATED APPLICATIONS

This application claims the benefit of French Patent Application Number 2307702 filed on Jul. 18, 2023, the entire disclosure of which is incorporated herein by way of reference.

FIELD OF THE INVENTION

The present invention relates to an aircraft nacelle comprising a sealed box structure and a door which opens to allow communication between the inside of the box structure and the outside of the aircraft, and to an aircraft comprising such a nacelle.

BACKGROUND OF THE INVENTION

In order to reduce emissions of carbon dioxide ($CO_2$) from aircraft engines, the use of dihydrogen as fuel is known. The aircraft then comprises a dihydrogen tank, and at least one engine fueled with said dihydrogen by virtue of pipelines which run in the aircraft, between the tank and each engine, and on which pumps, heaters and valves are installed.

Safety must be ensured if an incident occurs on the supply line between the tank and the engine. For this, it is known practice to set up various safety systems. For example, it is known practice to set up ventilation systems which ventilate the spaces which leaks of dihydrogen can enter.

Although such an arrangement performs well, setting up such ventilation systems in a nacelle causes the costs and the mass of the nacelle to increase.

SUMMARY OF THE INVENTION

An object of the present invention is to provide a nacelle comprising a sealed box structure accommodated in the nacelle, wherein the cowl of the nacelle has a door which opens between the inside of the box structure and the outside.

To that end, what is provided is an aircraft nacelle comprising:
- a structure,
- a cowl which is mounted on the structure, has an inner face facing into the nacelle, and has at least one window,
- a box structure sealingly fixed around the at least one window to the inner face so as to delimit, with the cowl, an internal volume intended to contain a conditioning device provided for conditioning dihydrogen,
- for the or each window, a door mounted pivotably on said cowl between a closed position in which the door blocks the window and an open position in which the door does not block the window,
- for each door, a maneuvering system comprising means for moving the door from the closed position to the open position,
- detecting means provided for detecting the presence of dihydrogen in the box structure and for supplying information indicative of such a presence, and
- a control unit designed to make the maneuvering system open on the basis of the information supplied by the detecting means.

With such an arrangement, if dihydrogen is detected in the box structure, the door opens to allow dihydrogen to be discharged out of the aircraft.

Advantageously, the cowl is mounted pivotably on the structure between an open position and a closed position.

Advantageously, the cowl has a hatch which is mounted pivotably on the cowl between an open position and a closed position.

Advantageously, the box structure is rendered inert.

Advantageously, the maneuvering system comprises hinges disposed along a first edge of the door.

According to a particular embodiment, said first edge is parallel to a direction of movement of the nacelle.

According to another particular embodiment, there are at least two doors disposed one behind another with respect to a direction of movement of the nacelle, the first edge of the frontmost door is to the rear of said door and the first edge of the rearmost door is to the front of said door.

Advantageously, the nacelle comprises a limiting means for preventing the door from opening.

The invention also provides an aircraft comprising a dihydrogen tank, a nacelle according to one of the preceding variants, a conditioning device disposed in the box structure, a pipeline fluidically connected between the tank and the conditioning device, and a shut-off valve mounted on the pipeline and made to open and close by the control unit.

BRIEF DESCRIPTION OF THE DRAWINGS

The aforementioned features of the invention, along with others, will become more clearly apparent on reading the following description of one exemplary embodiment, said description being given with reference to the appended drawings, in which.

DETAILED DESCRIPTION OF THE PREFERRED EMBODIMENTS

Figure 1:
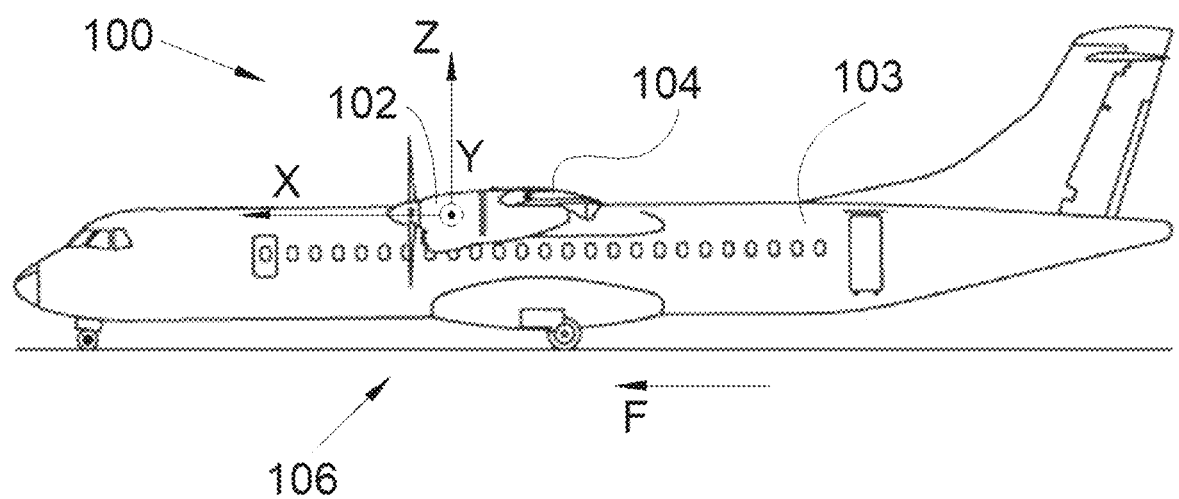
FIG. 1 is a side view of an aircraft according to the invention.

In the following description, terms relating to a position are considered in relation to an aircraft in a normal flight position, which is to say as shown in FIG. 1.

In the following description, and by convention, the X direction is the longitudinal direction of the aircraft, the Y direction is the transverse direction, which is horizontal when the aircraft is on the ground, and the Z direction is the vertical direction, which is vertical when the aircraft is on the ground, these three directions X, Y and Z being mutually orthogonal.

FIG. 1 shows an aircraft 100 which comprises a fuselage 103, to each side of which is fixed a wing 104 that bears at least one engine 106 operating with dihydrogen fuel. In the embodiment of the invention shown in FIG. 1, the engine 106 is a propeller engine, but any other type of engine is conceivable. In particular, the engine 106 can operate by direct combustion of dihydrogen or be an electric motor supplied with electricity by a dihydrogen-powered fuel cell.

The engine 106 is accommodated in a nacelle 102.

The arrow F indicates the direction of movement, which is to say the direction of forward travel, of the aircraft 100 and therefore of the nacelle 102 when the engines 106 are in operation.

Figure 2:
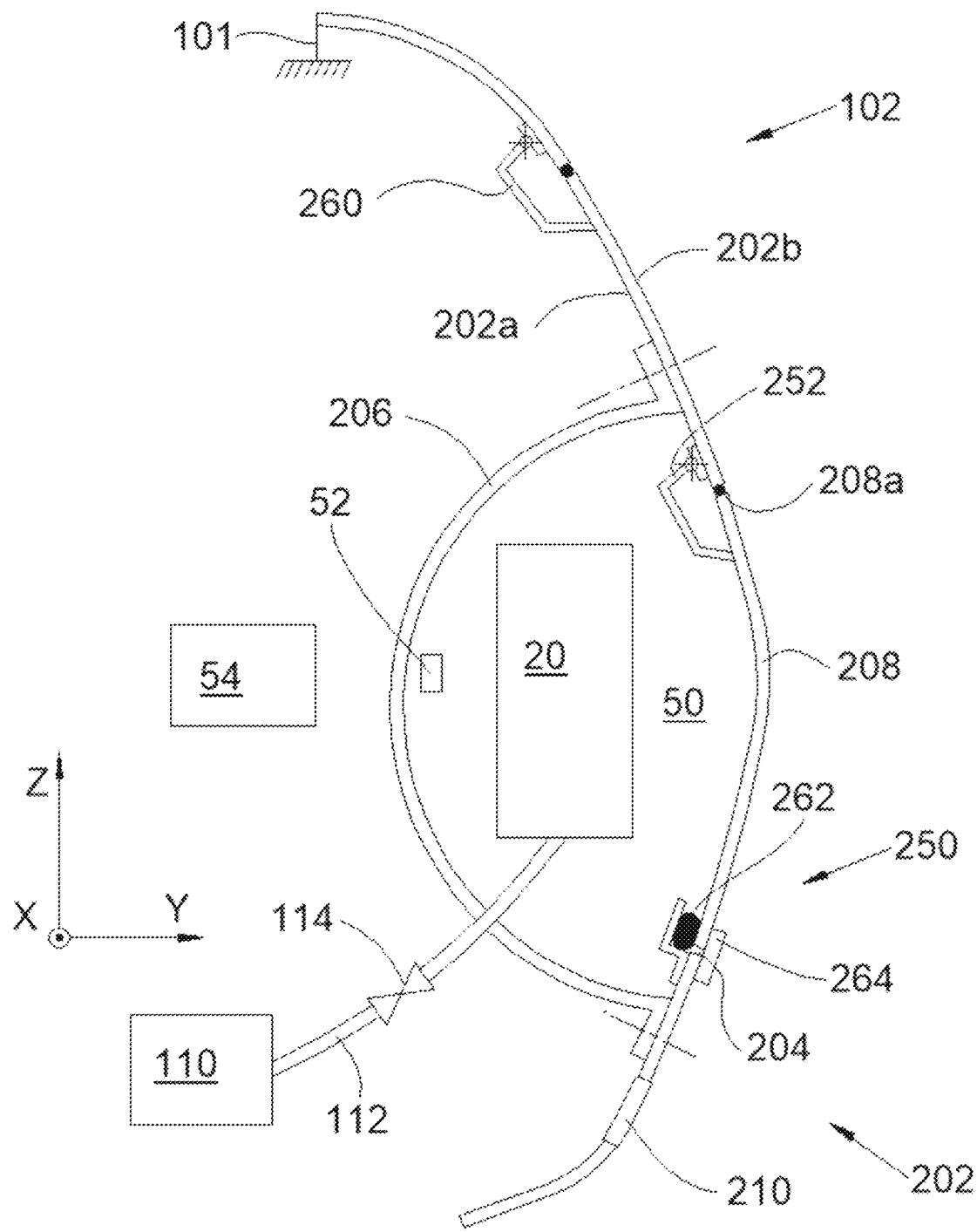
FIG. 2 is a sectional view of a nacelle according to a first embodiment of the invention.
Figure 3:
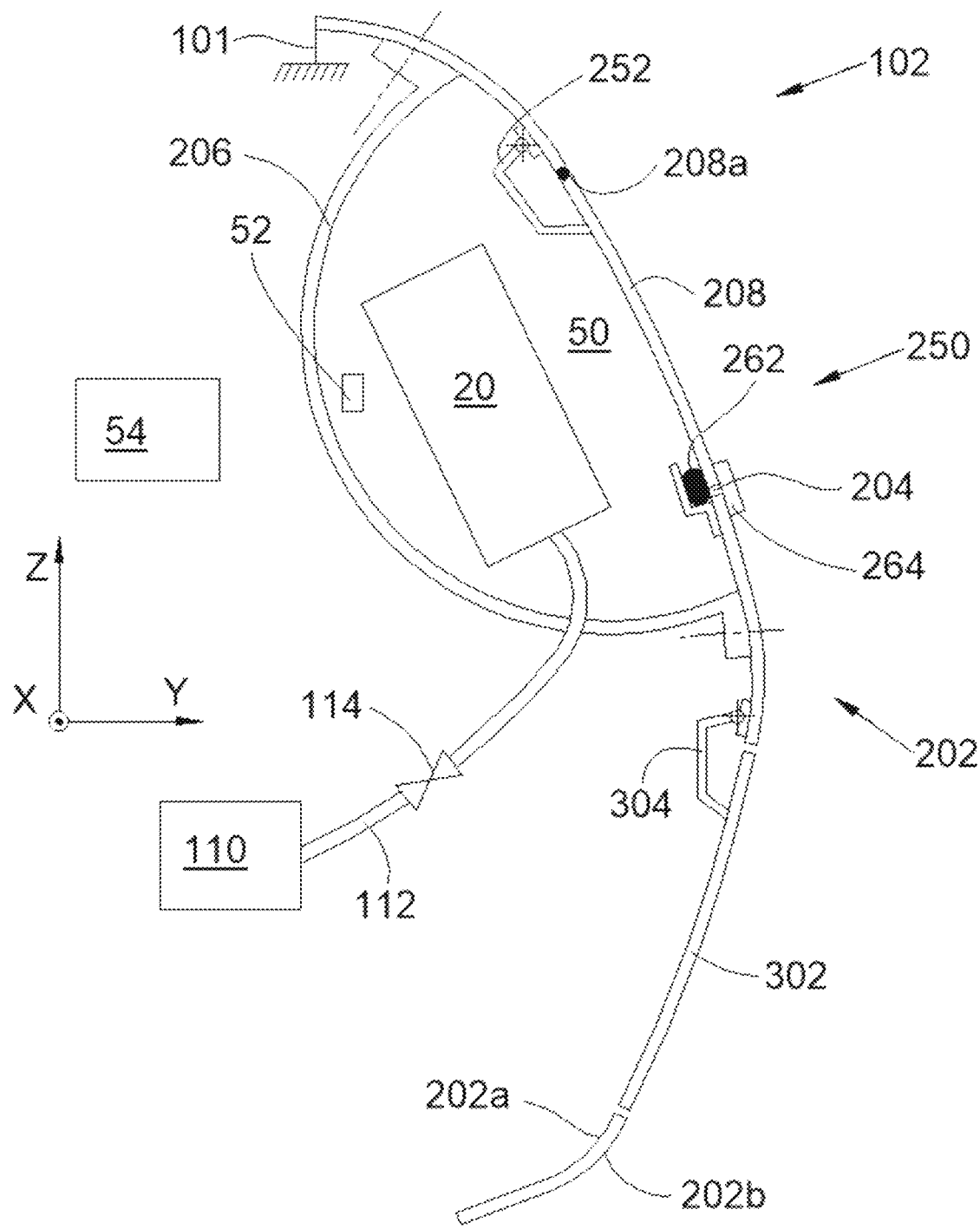
FIG. 3 is a sectional view of a nacelle according to a second embodiment of the invention.

FIGS. 2 and 3 show sections in a plane perpendicular to the longitudinal direction of the nacelle 102 according to two embodiments.

The aircraft 100 comprises at least one tank 110 in which the dihydrogen is stored, preferably in liquid form. The tank 110 may be disposed in the fuselage 103 or in the wings 104.

The aircraft 100 comprises conditioning devices 20 which serve to condition said dihydrogen before it is consumed by the engine 106. Such conditioning devices 20 are, for example, valves, heaters, pumps, etc. Dihydrogen is supplied to each conditioning device 20 through a pipeline 112 which comes directly or indirectly from the tank 110 and is thus fluidically connected between the tank 110 and the conditioning device 20.

The nacelle 102 comprises a structure 101 on which cowls 202 are mounted. Each cowl 202 constitutes the separation between the inside of the nacelle 102 and the outside of the aircraft 100 and comprises an inner face 202a facing into the nacelle 102 and an outer face 202b facing towards the outside of the aircraft 100.

The nacelle 102 also comprises a box structure 206 sealingly fixed to the inner face 202a so as to delimit, with the cowl 202, an internal volume 50 in which the conditioning device 20 is disposed. The sealing fixing ensures that, if dihydrogen is present in the internal volume 50, it cannot spread into the nacelle 102 through the wall of the box structure 206. The pipeline 112 sealingly passes through the wall of the box structure 206.

At least one window 204, which ensures fluidic communication between the internal volume 50 and the outside of the aircraft 100, is made in the cowl 202. The box structure 206 thus opens up outside the aircraft 100 via said at least one window 204.

The box structure 206 is fixed around said at least one window 204. The box structure 206 is fixed to the cowl 202 by any suitable means, such as screws, rivets, welding, etc.

For each window 204, the nacelle 102 comprises a door 208 mounted pivotably on the cowl 202 between a closed position in which the door 208 blocks the window 204 and an open position in which the door 208 does not block the window 204. In the closed position, the internal volume 50 is therefore sealed off from the outside of the aircraft 100, and in the open position, the internal volume 50 communicates with the outside of the aircraft 100, in particular in order to discharge any dihydrogen present in the box structure 206.

To maneuver each door 208, the nacelle 102 comprises a maneuvering system 250 which comprises means for moving the door 208 from the closed position to the open position, The maneuvering of the door 208 into the open position is conditional on the presence of dihydrogen in the box structure 206. To this end, the nacelle 102 also comprises detecting means 52 which are arranged in the box structure 206 and are provided for detecting the presence of dihydrogen in the box structure 206. The detecting means 52 are also provided to supply information indicative of such a presence of dihydrogen in the box structure 206.

The nacelle 102 also comprises a control unit 54 which communicates with the detecting means 52 and the maneuvering system 250. The control unit 54 is designed to make the maneuvering system 250 open on the basis of the information supplied by the detecting means 52, which is to say to make the maneuvering system 250 move the door 208 from the closed position to the open position when the detecting means 52 detect the presence of dihydrogen, and supply the corresponding message to the control unit 54.

Thus, with such a nacelle 102, when dihydrogen is detected in a box structure 206, its leaktightness with respect to the rest of the nacelle 102 prevents the dihydrogen from flowing towards the rest of the nacelle 102 and, after detection by the detecting means 52, the control unit 54 makes the corresponding door 208 open in order to discharge the dihydrogen out of the aircraft 100.

Such an installation therefore does not require an additional ventilation system which could make the nacelle 102 heavier.

The conditioning device 20 is fixed to the wall of the box structure 206 and/or to the door 208.

According to a particular embodiment, means of the maneuvering system 250 are also provided for moving the door 208 from the open position to the closed position, for example when the detecting means 52 no longer detect dihydrogen in the box structure 206. Such an arrangement makes it possible to close the door 208 in order to limit drag in flight.

According to a particular embodiment, the box structure 206 is rendered inert, either by evacuation or by introducing an inert gas.

To stop the flow of dihydrogen in the pipeline 112 and no longer supply it to the conditioning device 20 present in the box structure 206 in which a dihydrogen leak has been detected, the aircraft 100 comprises a shut-off valve 114 mounted on the pipeline 112 and made to open and close by the control unit 54, in particular on the basis of the information sent by the detecting means 52.

The shut-off valve 114 is disposed outside the box structure 206 and upstream thereof on the pipeline 112 in order to prevent a continuous flow of dihydrogen into the box structure 206.

As a result, when dihydrogen is detected in the box structure 206 by the detecting means 52, the control unit 54 makes the shut-off valve 114 close, preferably before making the door 208 open.

The detecting means 52 may take various forms and may be made up of one or more pressure sensors disposed in the box structure 206. Thus, if a pressure sensor detects a variation in pressure in the box structure 206, which is under vacuum or exhibits a known pressure of an inert gas, this means that there is a dihydrogen leak. The detecting means 52 may be supplemented by detection sensors suitable for detecting dihydrogen, and analyzing the data sent by these detection sensors makes it possible to know if there is a dihydrogen leak.

In the embodiment in FIG. 2, the cowl 202 on which the box structure 206 and the door 208 are installed is a cowl which is mounted movably on the structure 101. To this end, the nacelle 102 comprises main hinges 260 which cause the cowl 202 to pivot on the structure 101 and allow said cowl 202 to move between an open position and a closed position, and vice versa.

Conventionally, the cowl 202 is fitted with a latch which locks said cowl 202 to the structure 101 in the closed position.

When the cowl 202 needs to be opened, for example during maintenance operations, it is necessary to stop the supply of dihydrogen to the conditioning device 20 associated with said cowl 202 by closing the shut-off valve 114 and disconnecting the pipeline 112. To this end, the cowl 202 has a hatch 210 which is mounted pivotably on the cowl 202 between an open position and a closed position to allow a technician to access the inside of the nacelle 102.

Of course, the hatch 210 is positioned so as to allow a technician to access the shut-off valve 114 and the pipeline 112 when said hatch 210 is in the open position.

Conventionally, according to a particular embodiment, the hatch 210 is fitted with hinges and a latch which make it possible to pivot the hatch 210 on the cowl 202 and to lock said hatch 210 to said cowl 202 in the closed position.

In the embodiment in FIG. 3, the cowl 202 is mounted fixedly on the structure 101 and the nacelle 102 in this case comprises a movable cowl 302 which is mounted pivotably on the cowl 202, in this case via secondary hinges 304 which pivot the movable cowl 302 between an open position and a closed position, and vice versa.

Conventionally, the movable cowl 302 is fitted with a latch which locks said movable cowl 302 to the cowl 202 in the closed position.

In the embodiment of the invention shown in FIGS. 2 and 3, the maneuvering system 250 comprises hinges 252 disposed along a first edge 208a of the door 208. The hinges 252 in this case take the form of gooseneck fittings.

Figure 4:
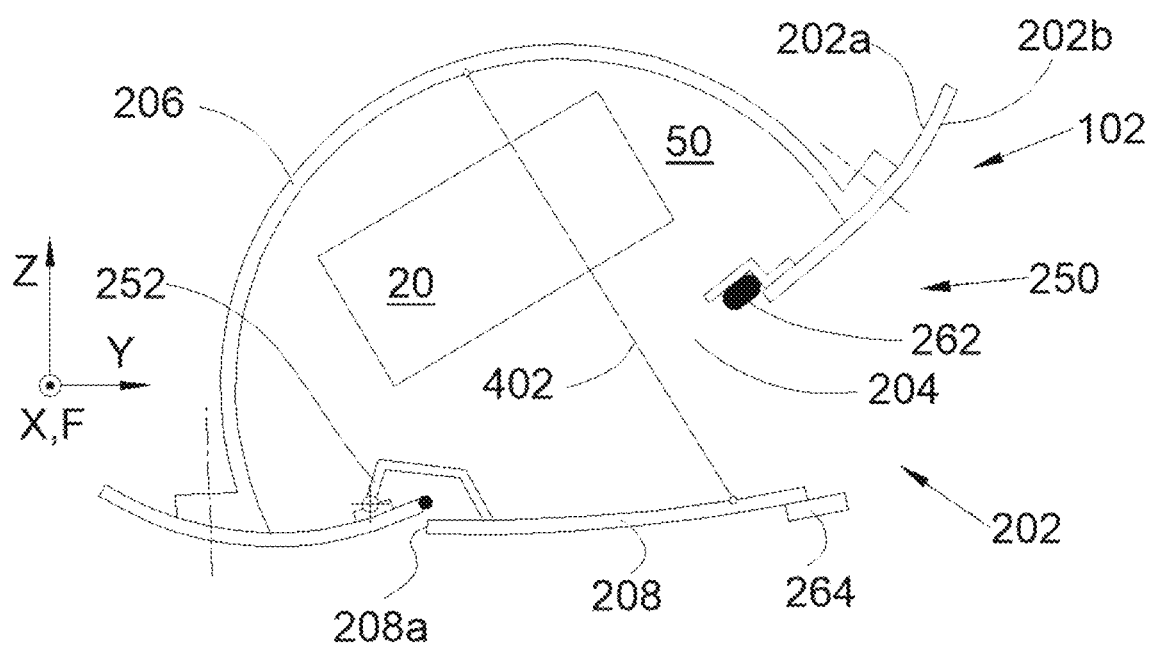
FIG. 4 is a sectional view of a nacelle according to a particular arrangement of the invention.

FIG. 4 shows an embodiment of the invention in which there is just one door 208 per box structure 206.
In this embodiment, the first edge 208a is parallel to the direction of movement F.

In the embodiment of FIG. 4, the first edge 208a is a lower edge of the door 208, but in another embodiment, which is not shown, the first edge 208a may be an upper edge of the door 208.

Depending on the position of the first edge 208a, the door 208 then opens about a hinge axis which is generally horizontal and parallel to the longitudinal direction X.

Figure 5:
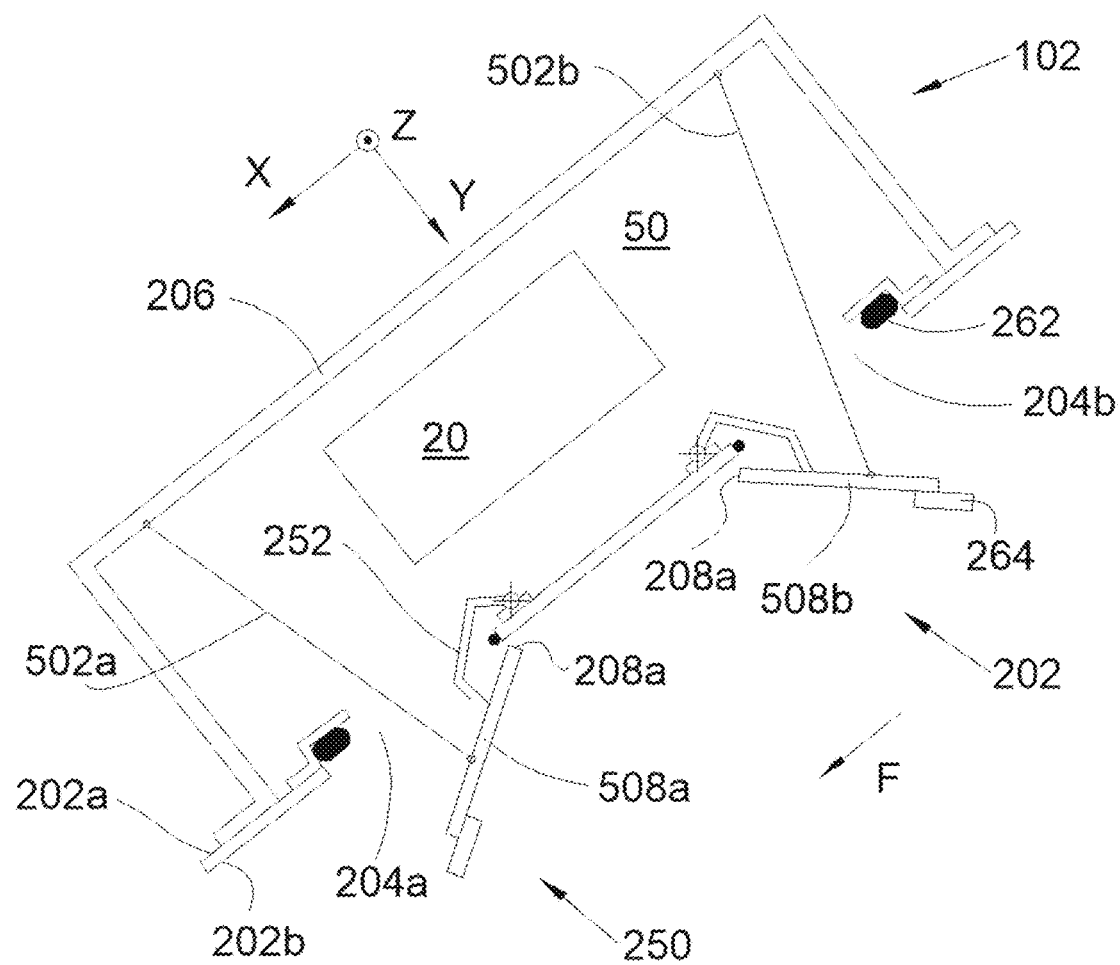
FIG. 5 is a sectional view of a nacelle according to another particular arrangement of the invention, and FIG. 6 schematically illustrates an example of a control unit utilized in the invention.

FIG. 5 shows an embodiment of the invention in which there are two doors 508a-b per box structure 206. The two doors 508a-b are disposed one behind the other with respect to the direction of movement F of the nacelle 102 and there is therefore a front door 508a and a rear door 508b.

The first edge 208a of the frontmost door 508a is then at the rear of said door 508a and the first edge 208a of the rearmost door 508b is then at the front of said door 508b. Each first edge 208a is then generally perpendicular to the direction of movement F.

As a result, when the doors 508a-b are open, the outside air rushes into the internal volume 50 through the window 204a corresponding to the front door 508a and leaves the internal volume 50 through the window 204b corresponding to the rear door 508b.

The position of the front door 508a assists the entry of the outside air into the internal volume 50.

The maneuvering system 250 also comprises an active element for moving the door 208, 508a-b. This active element controlled by the control unit 54 is for example a (hydraulic, pneumatic, electric) jack mounted between the door 208, 508a-b and the wall of the box structure 206, for example, or an electric motor mounted at the hinges 252, for example.

To limit the opening of the door 208, 508a-b beyond an opening angle, the nacelle 102 comprises a limiting means 402, 502a-b which prevents the door 208, 508a-b from opening.

The limiting means 402, 502a-b may be a link rod or a cord fixed between the door 208, 508a-b and the wall of the box structure 206. The limiting means 402, 502a-b can also be the jack of the maneuvering system 250.

To ensure proper leaktightness of the internal volume 50, seals 262 are provided along the edges of the door 208, 508a-b.

The door 208, 508a-b may be advantageously fitted with a latch 264 which locks said door 208, 508a-b to the cowl 202 in the closed position.

Figure 6:
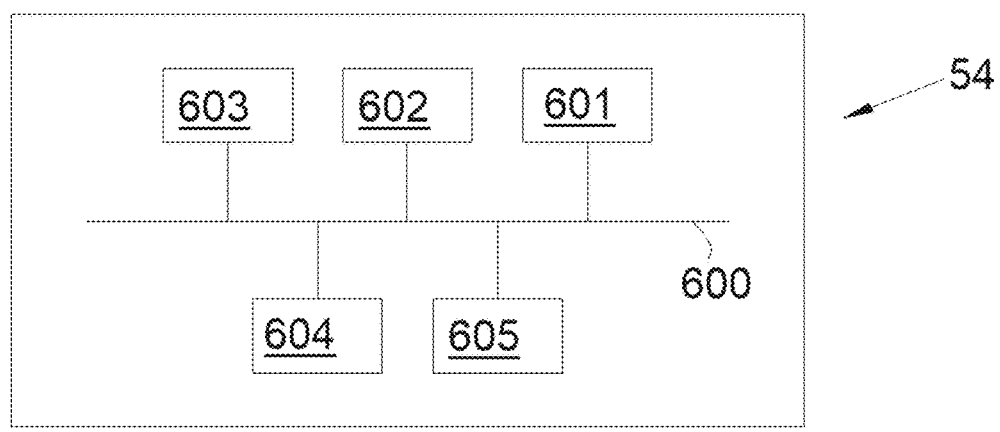

FIG. 6 schematically illustrates an example of a control unit 54 utilized in the invention.

The control unit 54 comprises the following, connected by a communication bus 600: a processor or CPU (central processing unit) 601; a random-access memory (RAM) 602; a read-only memory (ROM) 603, for example an electrically erasable programmable ROM (EEPROM), such as a flash memory; a storage unit, such as a hard disk drive (HDD) 604 or a storage medium reader such as a secure digital (SD) card reader; and an interface (I/f) manager 605.

The interface (I/f) manager 605 allows the control unit 54 to interact with the other components, such as the detecting means 52, the shut-off valve 114, the maneuvering system 250, etc.

The processor 401 is capable of executing instructions loaded into the random access memory 402 from the read-only memory 403, from an external memory, from a storage medium (such as an SD card), or from a communication network. When the control unit 220 is powered up, the processor 401 is capable of reading instructions from the random access memory 402 and of executing them. These instructions form a computer program causing the processor 401 to implement all or some of the steps, processes and operations described here.

All or some of the steps, processes and operations described here can thus be implemented in software form by having a programmable machine, for example a DSP (digital signal processor) or a microcontroller, execute a set of instructions or be implemented in hardware form by a machine or a dedicated electronic component (chip) or a dedicated set of electronic components (chipset), for example an FPGA (field-programmable gate array) or ASIC (application-specific integrated circuit) component. In general, the control unit 220 comprises electronic circuitry designed and configured to implement the operations, processes and steps described here.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft, comprising:
   a dihydrogen tank,
   a nacelle, including:
      a structure, a cowl, mounted on the structure, having an inner face facing into the nacelle and at least one window, a box structure sealingly fixed around the at least one window to the inner face of the cowl so as to delimit, with the cowl, an internal volume which contains a first partial internal volume of the nacelle, such that the box structure and the cowl are configured to contain a conditioning device provided for conditioning dihydrogen, for each window, a door mounted pivotably on said cowl between a closed position, in which the door blocks the window, and an open position, in which the door does not block the window, for each door, a maneuvering system comprising means for moving the door from the closed position to the open position, detecting means provided for detecting a presence of dihydrogen in the box structure and for supplying information indicative of such a presence, and a control unit designed to make the maneuvering system open on a basis of the information supplied by the detecting means, wherein the cowl is mounted pivotably on the structure between an open position and a closed position and wherein the cowl has a hatch mounted pivotably on the cowl between an open position and a closed position, a conditioning device disposed in the box structure, a pipeline fluidically connected between the dihydrogen tank and the conditioning device, wherein the pipeline sealingly passes through the box structure such that the pipeline is disconnected when the cowl is opened, and a shut-off valve mounted on the pipeline which is disposed outside the box structure and which is configured to be opened and closed by the control unit, such that the hatch provides access to a second partial internal volume of the nacelle which is outside of the box structure, the second partial internal volume of the nacelle including the shut-off valve.

2. The aircraft according to claim 1, wherein the box structure is rendered inert by evacuation or by introducing an inert gas.

3. The aircraft according to claim 1, wherein the maneuvering system comprises hinges disposed along a first edge of the door.

4. The aircraft according to claim 3, wherein said first edge is parallel to a direction of movement of the nacelle.

5. The aircraft according to claim 3, wherein there are at least two doors disposed one behind another with respect to a direction of movement of the nacelle, wherein that a first edge of a frontmost door is to a rear of said frontmost door, and wherein a first edge of a rearmost door is to a front of said rearmost door.

6. The aircraft according to claim 1, further comprising: a limiting means which prevents the door from opening.

7. The aircraft according to claim 1, wherein the control unit causes the shut-off valve to open and close on the basis of the information sent by the detecting means, such that when dihydrogen is detected in the box structure by the detecting means, the control unit causes the shut-off valve to close.

8. The aircraft according to claim 7, wherein, when dihydrogen is detected in the box structure by the detecting means, the control unit causes the shut-off valve to close before causing the maneuvering system to move the door from the closed position to the open position.

9. The aircraft according to claim 1, wherein, for each door, seals are provided along an edge of the door.

* * * * *